US012307318B1

(12) United States Patent
Fink et al.

(10) Patent No.: US 12,307,318 B1
(45) Date of Patent: May 20, 2025

(54) RADIO-FREQUENCY IDENTIFICATION (RFID)-ENABLED CONNECTIONS AND LOCALIZATION—ASSEMBLY AND METHOD

(71) Applicant: The United States of America as represented by the Administrator of NASA, Washington, DC (US)

(72) Inventors: Patrick W. Fink, Houston, TX (US); Gregory Y. Lin, Houston, TX (US); Phong H. Ngo, Houston, TX (US); Lazaro D. Rodriguez, Houston, TX (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 18/639,149

(22) Filed: Apr. 18, 2024

(51) Int. Cl.
    *G06K 19/06*     (2006.01)
    *G06K 19/077*     (2006.01)
    (Continued)

(52) U.S. Cl.
    CPC ......... *G06K 19/07779* (2013.01); *H01Q 7/00* (2013.01); *H04B 5/26* (2024.01); *H04B 5/43* (2024.01); *H01Q 1/2208* (2013.01)

(58) Field of Classification Search
    CPC ......... G06K 19/07749; G06K 7/10316; G06K 19/07779; G06K 19/07747; H01Q 7/00;
    (Continued)

(56) References Cited

U.S. PATENT DOCUMENTS

| 6,411,921 B1 | 6/2002 | Schiltz et al. |
| 6,609,076 B2 | 8/2003 | Schuh et al. |

(Continued)

FOREIGN PATENT DOCUMENTS

| CN | 107203728 A | 9/2017 | |
| DE | 102013112599 | * 5/2015 | ........... H01Q 1/2208 |

(Continued)

OTHER PUBLICATIONS

L. E. Miller et al., RFID-Assisted Indoor Localization and Communication for First Responders (9 pages).

(Continued)

*Primary Examiner* — Daniel St. Cyr
(74) *Attorney, Agent, or Firm* — Kurt G. Hammerle

(57) ABSTRACT

A radio-frequency identification (RFID)-based method and apparatus, per an implementation, comprises a first electrically-conductive loop and a first RFID integrated circuit (IC) assembly, a second electrically-conductive loop and a second RFID IC assembly, and a resonant antenna. When the first assembly, the second assembly, and the resonant antenna are brought within proximity of one another, such as when a connection is made among associated objects, a general symmetry is exhibited between a configuration of the first electrically-conductive loop and first RFID IC assembly relative to the resonant antenna, and a configuration of the second electrically-conductive loop and second RFID IC assembly relative to the resonant antenna. A generally corresponding RF signal phase and RF signal strength emanate from the first electrically-conductive loop and first RFID IC assembly and from the second electrically-conductive loop and second RFID IC assembly when interrogated by an RFID reader due to the general symmetry.

17 Claims, 8 Drawing Sheets

(51) Int. Cl.
*H01Q 7/00* (2006.01)
*H04B 5/26* (2024.01)
*H04B 5/43* (2024.01)
*H01Q 1/22* (2006.01)

(58) Field of Classification Search
CPC .......... H01Q 1/2216; H04B 5/26; H04B 5/43; H04B 5/45
USPC ........................................ 235/492, 385, 383
See application file for complete search history.

(56) References Cited

U.S. PATENT DOCUMENTS

| | | |
|---|---|---|
| 6,847,856 B1 | 1/2005 | Bohannon |
| 7,170,393 B2 | 1/2007 | Martin |
| 7,207,488 B2 | 4/2007 | Hammerslag et al. |
| 7,275,682 B2 | 10/2007 | Excoffier et al. |
| 8,022,815 B2 | 9/2011 | Frank |
| 8,789,267 B2 | 7/2014 | Peng et al. |
| 8,816,857 B2 | 8/2014 | Nordin et al. |
| 8,973,815 B2 | 3/2015 | Murphy |
| 9,167,242 B1 | 10/2015 | Meyer |
| 9,336,421 B1 | 5/2016 | Fink et al. |
| 9,389,610 B2 | 7/2016 | Di Pietro et al. |
| 9,747,540 B2 | 8/2017 | Murphy |
| 10,089,506 B1 | 10/2018 | Fink et al. |
| 10,502,594 B2 | 12/2019 | Baldwin et al. |
| 10,810,387 B2 | 10/2020 | Nikitin et al. |
| 2006/0109130 A1* | 5/2006 | Hattick .................. H01L 24/24 340/572.7 |
| 2007/0199989 A1 | 8/2007 | Piety et al. |
| 2009/0009335 A1* | 1/2009 | Stewart .............. G06K 7/10336 340/572.7 |
| 2010/0019905 A1 | 1/2010 | Boddie et al. |
| 2010/0182144 A1 | 7/2010 | Yamashita et al. |
| 2010/0308118 A1* | 12/2010 | Kataya ..................... H01Q 9/40 235/492 |
| 2010/0309068 A1* | 12/2010 | Duron ..................... H01Q 7/00 343/730 |
| 2013/0048827 A1 | 2/2013 | Meier et al. |
| 2016/0161590 A1 | 6/2016 | Sadr et al. |
| 2018/0145404 A1* | 5/2018 | Lavedas ................. H04B 5/00 |
| 2020/0264220 A1* | 8/2020 | Lavedas ............. G01R 29/0878 |
| 2023/0361599 A1* | 11/2023 | Podhola ................ H02J 50/10 |

FOREIGN PATENT DOCUMENTS

| | | |
|---|---|---|
| WO | WO2016016405 A1 | 2/2016 |
| WO | WO2019030119 A1 | 2/2019 |

OTHER PUBLICATIONS

Meng-Ju Hsieh et al., RFIBricks: Interactive Building Blocks Based on RFID, Apr. 2018 (11 pages).

Laiba Shahid et al., Chipless RFID Tag for Touch Event Sensing and Localization, Jan. 2, 2020 (12 pages).

* cited by examiner

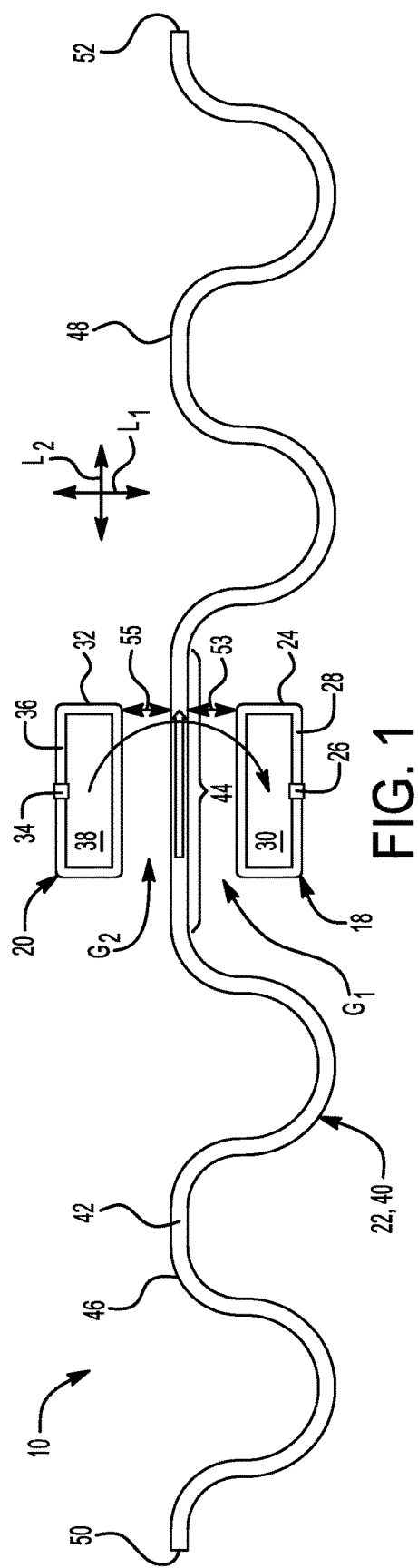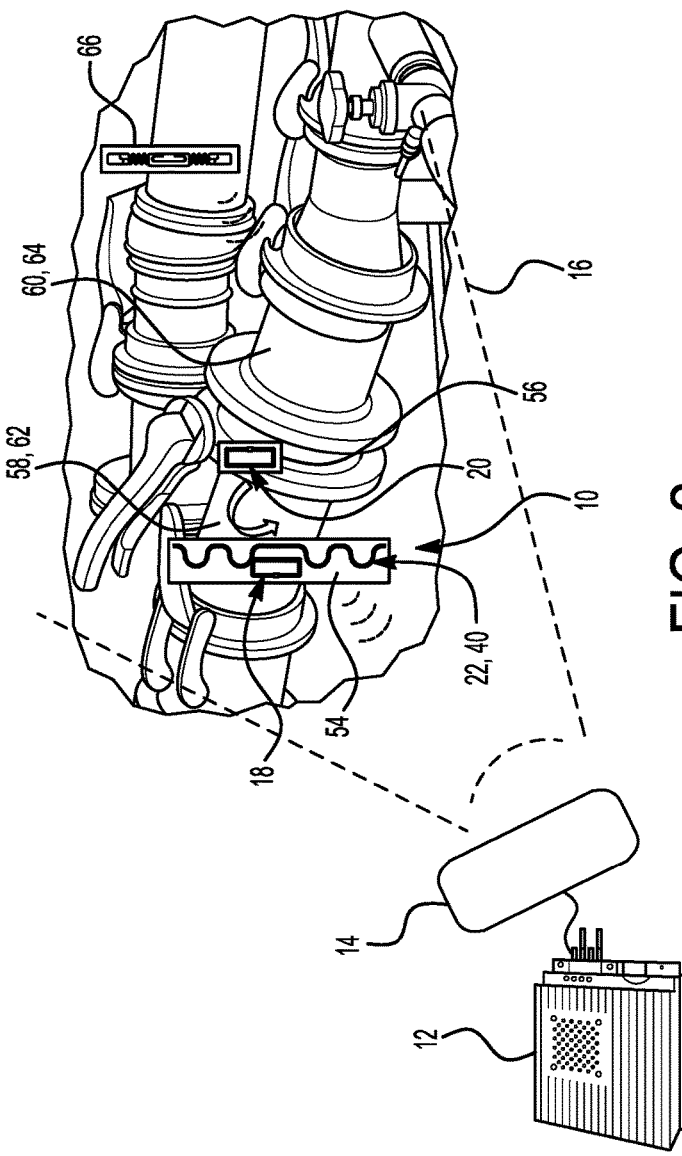

RADIO-FREQUENCY IDENTIFICATION (RFID)-ENABLED CONNECTIONS AND LOCALIZATION—ASSEMBLY AND METHOD

STATEMENT OF GOVERNMENT INTEREST

The embodiments described herein may be manufactured and used by or for the Government of the United States of America without payment of any royalties thereon or therefor.

TECHNICAL FIELD

The present disclosure relates generally to radio-frequency identification (RFID) technologies and, more particularly, to employing RFID technologies for localization and connection ascertainment of objects.

BACKGROUND

Radio-frequency identification (RFID) systems are often employed to detect the presence of RFID tags carried by objects and, in some cases, to identify the location of the tagged objects for tracking purposes. Use of RFID systems is widespread. The systems can be used in a warehouse, factory, and retail setting to keep track of inventory, as well as in medical, automotive, aviation, agricultural, industrial, restaurant, wine cellar, and parking applications, among many other possibilities.

Determining when a pair or more of objects have been connected together or set in an intended place remains a challenge in many industries and in many situations, absent physical interactions from persons. Examples in which such determinations are often sought include, but are not limited to, electrical connectors that mate, members of a structural assembly that attach, and pipeline segments that fasten.

Use of RFID systems with connecting objects has been demonstrated, but with limited outcome. Unrelated and extraneous RFID tags read by RFID readers are frequently indistinguishable from the RFID tags carried by the connecting objects, and such unrelated and/or extraneous tags consequently hinder determinations of proper connection.

SUMMARY

In an embodiment, a radio-frequency identification (RFID)-enabled method may include several steps. One step may involve providing a first electrically-conductive loop and a first RFID integrated circuit (IC). The first RFID IC may be electrically coupled with the first electrically-conductive loop. The first electrically-conductive loop and the first RFID IC may be carried by a first object. Another step may involve providing a second electrically-conductive loop and a second RFID IC. The second RFID IC may be electrically coupled with the second electrically-conductive loop. The second electrically-conductive loop and the second RFID IC may be carried by a second object. Yet another step may involve providing a resonant antenna. And yet another step may involve bringing the first object, the second object, and the resonant antenna within proximity of one another. When within proximity of one another such as via placement of the first and second objects or via connection between the first and second objects the first electrically-conductive loop and the first RFID IC have a first geometrical configuration relative to a portion or more of the resonant antenna, and the second electrically-conductive loop and the second RFID IC have a second geometrical configuration relative to the portion or more of the resonant antenna. The first geometrical configuration and the second geometrical configuration exhibit general symmetry with respect to each other.

In an embodiment, a radio-frequency identification (RFID)-based assembly may include a first electrically-conductive loop and RFID integrated circuit (IC) assembly, a second electrically-conductive loop and RFID IC assembly, and a resonant antenna. At least one of the three, such as the first electrically-conductive loop and RFID IC assembly, the second electrically-conductive loop and RFID IC assembly, and/or the resonant antenna, has a known location. When a connection is made among objects carrying one or more of the first electrically-conductive loop and RFID IC assembly, the second electrically-conductive loop and RFID IC assembly, and/or the resonant antenna, a generally symmetrical configuration is present between the first electrically-conductive loop and RFID IC assembly and the second electrically-conductive loop and RFID IC assembly with respect to a portion or more of the resonant antenna.

In another embodiment, a radio-frequency identification (RFID)-enabled method may include several steps. One step may include providing a first electrically-conductive loop and RFID integrated circuit (IC) assembly that is carried by or operatively attached to a stationary object, and another step may include providing a second electrically-conductive loop and RFID IC assembly that is carried by a moveable object. Location of the stationary object is known. Another step of the method may include providing a resonant antenna. The resonant antenna may be carried by the stationary object, it may be carried by the moveable object, or it may be carried by both the stationary object and the moveable object. Yet another step may include connecting the stationary object and the moveable object together. When connected, the first electrically-conductive loop and RFID IC assembly has a first geometrical configuration relative to a portion or more of the resonant antenna, and the second electrically-conductive loop and RFID IC assembly has a second geometrical configuration relative to the portion or more of the resonant antenna. The first geometrical configuration and the second geometrical configuration exhibit general symmetry with respect to each other. Yet another step may include ascertaining the connection between the stationary object and the moveable object. The step of ascertaining may be based in part upon the known location of the stationary object. The step of ascertaining may further be based in part upon an RF signal phase difference between the first electrically-conductive loop and RFID IC assembly and the second electrically-conductive loop and RFID IC assembly when subjected to interrogation at one or more operational frequencies within an RFID operational band. The step of ascertaining may further be based in part upon an RF signal strength difference between the first electrically-conductive loop and RFID IC assembly and the second electrically-conductive loop and RFID IC assembly when subjected to interrogation at the operational frequency(ies), or the step of ascertaining may comprise both the RF signal phase difference and the RF signal strength difference between the first electrically-conductive loop and RFID IC assembly and the second electrically-conductive loop and RFID IC assembly when subjected to interrogation at the operational frequency(ies).

BRIEF DESCRIPTION OF THE DRAWINGS

One or more aspects of the disclosure will hereinafter be described in conjunction with the appended drawings, wherein like designations denote like elements, and wherein:

FIG. 1 is a schematic of an embodiment of a radio-frequency identification (RFID)-based assembly for localization and for ascertaining connections;

FIG. 2 shows an exemplary application of the RFID-based assembly of FIG. 1;

DETAILED DESCRIPTION

Figure 3:
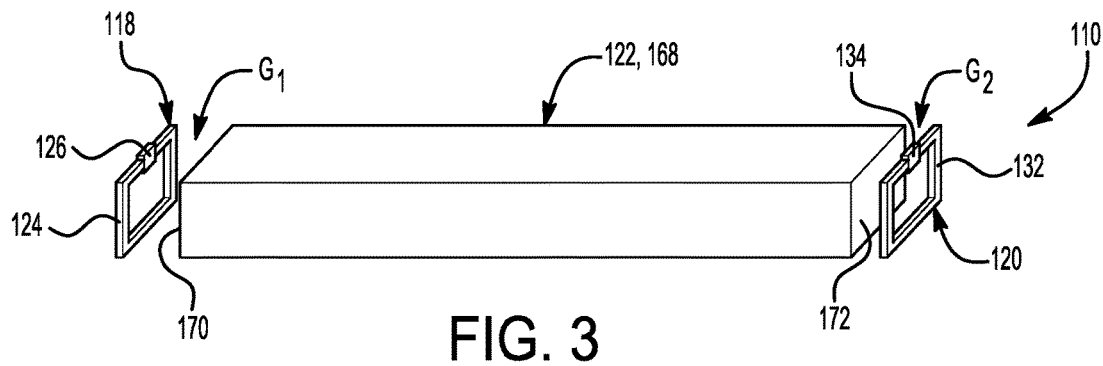
FIG. 3 is a schematic of another embodiment of an RFID-based assembly.

Referring generally to the drawings, at least some embodiments of a radio-frequency identification (RFID)-enabled method and assembly can be employed to determine the location ("localization") of objects and to ascertain whether connections have been made among objects. The localization of objects, in particular, has been demonstrated with increased precision. The RFID-enabled method and assembly are suitable, per certain embodiments, for use with mainstream RFID technology protocols (e.g., EPCglobal Class 1 Generation 2 protocol), including for use with passive and ultra-high frequency (UHF) RFID tags. Automation of localization and connection state is more readily facilitated with use of certain embodiments of the RFID-enabled method and assembly described herein. Radio-frequency (RF) signal phase, RF signal strength, or both, are leveraged in the RFID-based assembly, as detailed below per some embodiments, for a more capable localization and ascertainment of connection. The challenges encountered in previous efforts, in which unrelated and extraneous RFID tags hinder effective localization and ascertainment of connection, have been resolved with certain embodiments of the RFID-enabled method and the RFID-based assembly described herein. Still, a particular embodiment of the RFID-enabled method and assembly may exhibit only one, or a combination of, the advancements set forth herein, none of the advancements, or other advancements unmentioned herein.

As used herein, and for purposes of referencing connecting objects of the RFID-enabled method and assembly, the term "connection" and its grammatical variations are intended to have an expansive meaning that refers to objects coming together to connect, attach, fasten, mate, link, join, plug, unite, or the like.

In general, the method and assembly described herein are useful in many applications where localization and connection ascertainment are sought. Examples include warehouse settings, factory settings, and retail settings, as well as in medical, automotive, aviation, agricultural, industrial, restaurant, and wine cellar applications, among others. More particular examples include electrical connectors that mate, members of a structural assembly that attach, pipeline segments that fasten, and placement of bottles in wine cellars, among many other possibilities. Still further, the RFID-based method and assembly may find ready use in space vehicle and spacecraft applications, such as amid transport and attachment and detachment of interior cargo.

With reference to FIGS. 1 and 2, a larger RFID system can include an RFID-based assembly 10 and an RFID reader 12 in its setup, among other possible components. The RFID reader 12 can have one or more RFID antennas 14 spanning therefrom. The RFID antenna 14 radiates wireless signals in the form of electromagnetic waves amid its use in the RFID system. The RFID antenna 14 establishes an interrogation zone or field of view (FOV) 16 for interrogating any RFID tags occupied therein and can receive RF signals from the RFID tags in response. Communications between the RFID antenna 14 and RFID tags are wireless communications. The RFID-based assembly 10 can have various designs, constructions, and components in different embodiments depending upon—among other potential factors—its intended application of use. The figures present several embodiments of the RFID-based assembly 10. In FIGS. 1 and 2, a first embodiment of the RFID-based assembly 10 includes a first RFID ring element 18, a second RFID ring element 20, and a resonant antenna 22. Still, the RFID-based assembly 10 could have more, less, and/or different components in other embodiments.

The first RFID ring element 18 makes up a part of a first RFID tag. When the first RFID ring element 18 resides in operational proximity to the resonant antenna 22, functionality of the first RFID tag is established. When subject to interrogation by the RFID reader 12, the first RFID tag is prompted to emit RF signals in return. The first RFID tag is a passive type of RFID tag in the embodiment described here. The first RFID ring element 18 can itself have various designs, constructions, and components, depending on the embodiment. In the embodiment of FIGS. 1 and 2, the first RFID ring element 18 includes a first electrically-conductive loop 24 and a first RFID integrated circuit (IC) 26. The first electrically-conductive loop 24 and the first RFID IC 26 are electrically coupled and connected to each other. The first electrically-conductive loop 24 can be in the form of an electrically-conductive microstrip, wire, foil, or some similar construction, and loop 24 can be composed of a high conductivity metal such as a copper metal. In the embodiment here, the first electrically-conductive loop 24 exhibits a two-dimensional and generally planar conformation. An electrically-conductive line 28 furnishes the first electrically-conductive loop 24, per this embodiment. The first electrically-conductive loop 24 has a rectangular shape in its depiction in the figures, but could have other shapes in other embodiments such as a square shape, circular shape, triangular shape, or something else. Further, high conductivity metal is absent at an interior 30 of the first electrically-conductive loop's shape, as shown. The first RFID IC 26 is an electronic circuit that, when activated amid interrogation by the RFID reader 12, can produce a response transmission indicative of information and data such as a unique identifier.

With continued reference to FIGS. 1 and 2, the second RFID ring element 20 has the same design and construction and components as the first RFID ring element 18. The first and second RFID ring elements 18, 20 are mirror images of each other about the resonant antenna 22 when a connection is made, as demonstrated in FIG. 1, and hence exhibit a generally corresponding formation with respect to each other. The first and second RFID ring elements 18, 20 have the same size and shape with respect to each other. In other words, a "general symmetry" is readily facilitated among the first and second RFID ring elements 18, 20 and the resonant antenna 22, as described below in greater detail, in order to effect a shared and similar propagation transmission path of RF signaling therefrom and to the RFID reader 12.

The second RFID ring element 20 makes up a part of a second RFID tag. When the second RFID ring element 20 resides in operational proximity to the resonant antenna 22, functionality of the second RFID tag is established. When subject to interrogation by the RFID reader 12, the second RFID tag is prompted to emit RF signals in return. The second RFID tag is a passive type of RFID tag in the embodiment here. The second RFID ring element 20 can itself have various designs, constructions, and components, depending on the embodiment. In the embodiment of FIGS. 1 and 2, the second RFID ring element 20 includes a second electrically-conductive loop 32 and a second RFID integrated circuit (IC) 34. The second electrically-conductive loop 32 and the second RFID IC 34 are electrically coupled and connected to each other. The second electrically-conductive loop 32 can be in the form of an electrically-conductive microstrip, wire, foil, or some similar construction, and loop 32 can be composed of a high conductivity metal such as a copper metal. In the embodiment here, the second electrically-conductive loop 32 exhibits a two-dimensional and generally planar conformation. An electrically-conductive line 36 furnishes the second electrically-conductive loop 32, per this embodiment. The second electrically-conductive loop 32 has a rectangular shape in its depiction in the figures, but could have other shapes in other embodiments such as a square shape, circular shape, triangular shape, or something else. Further, high conductivity metal is absent at an interior 38 of the second electrically-conductive loop's shape, as shown. The second RFID IC 34 is an electronic circuit that, when activated amid interrogation by the RFID reader 12, can produce a response transmission indicative of information and data such as a unique identifier.

The resonant antenna 22 makes up a part of both the first and second RFID tags when operational proximity is present with the first and second RFID ring elements 18, 20 relative to the resonant antenna 22. In this regard, the resonant antenna 22 constitutes a common antenna for the first and second RFID ring elements 18, 20. The resonant antenna 22 receives RF signals and radiates RF signals when subject to interrogation by the RFID reader 12. When RF signals are received by the resonant antenna 22 and it is within operational proximity of the first and second RFID ring elements 18, 20, in general, electromagnetic energy couples to the first and second electrically-conductive loops 24, 32 and energizes the first and second RFID ICs 26, 34. An electromagnetic coupling is thereby effected among the resonant antenna 22 and the first and second RFID ring elements 18, 20. The resonant antenna 22 can be of various types and can have various designs, constructions, and components, depending on the embodiment. For example, the resonant antenna 22 could be a dipole antenna, a microstrip patch antenna, a slot antenna, a planar inverted-F antenna (PIFA), or some other suitable type of antenna. In the embodiment of FIGS. 1 and 2, the resonant antenna 22 is in the form of a dipole antenna 40. The dipole antenna 40, in this embodiment, is formed of a single electrically-conductive path 42 that can be composed of a high conductivity metal such as a copper metal. The dipole antenna 40 has a central linear portion 44. Dipole antenna 40 has a first wave-like portion 46 extending from one side of the central linear portion 44 and a second wave-like portion 48 extending from an opposite side of the central linear portion 44. The first wave-like portion 46 terminates at a first free end 50, and the second wave-like portion 48 terminates at a second free end 52. Current has been shown to have an increased magnitude at the central linear portion 44 compared to that at the first and second free ends 50, 52.

In FIG. 1, the resonant antenna 22 and the first and second RFID ring elements 18, 20 are depicted in operational proximity relative to one another. Here, according to this embodiment, the resonant antenna 22 and the first and second RFID ring elements 18, 20 reside in a common two-dimensional plane. The first and second RFID ring elements 18, 20 are located on opposing sides of the central linear portion 44. A first longitudinally directional ($L_1$) spacing 53 is defined and situated between the first electrically-conductive loop 24 and the central linear portion 44, and, in a similar manner, a second longitudinally directional spacing 55 is defined and situated between the second electrically-conductive loop 32 and the central linear portion 44. The first and second longitudinal spacings 53, 55 are devoid of electrically-conductive metals according to this embodiment. Further, a laterally directional ($L_2$) extent of the first and second RFID ring elements 18, 20 is less in length than that of the central linear portion 44, or its length could be approximately equivalent to that of the central linear portion 44. The first RFID IC 26 is positioned at a far longitudinal side of the first RFID ring element 18 with respect to the central linear portion 44, and likewise the second RFID IC 34 is positioned at an opposite and far longitudinal side of the second RFID ring element 20 with respect to the central linear portion 44.

Furthermore, in application and use, the first RFID ring element 18, the second RFID ring element 20, and/or the resonant antenna 22 can be carried by or positioned on one or more substrates, per various embodiments. The electrically-conductive metals of the first and second RFID ring elements 18, 20 and resonant antenna 22, for instance, can be fabricated on top surfaces of the substrate(s). The substrate(s) can be in the form of an insulating dielectric substrate, such as a printed circuit board and can be in the form of a laminate. The substrate(s) can have a rectangular or square-like overall shape. In the embodiment of FIG. 2, the first RFID ring element 18 is carried by a first substrate 54, and the second RFID ring element 20 is similarly carried by a second substrate 56. The first and second substrates 54, 56 are discrete components relative to each other. In this embodiment, the resonant antenna 22 is also carried by the first substrate 54. The resonant antenna 22 is located adjacent to, and beside, the first RFID ring element 18 at the first substrate 54, similar to the relative positioning presented in FIG. 1. The first substrate 54 can have a larger overall size compared to the second substrate 56 in order to accommodate placement of both of the first RFID ring element 18 and resonant antenna 22. Still, in other embodiments, the first and second RFID ring elements 18, 20 and resonant antenna 22 could be carried by individually separate and discrete substrates for instance, a first substrate could carry the first RFID ring element 18, a second substrate could carry the second RFID ring element 20, and a third substrate could carry the resonant antenna 22.

According to certain embodiments, the first RFID ring element 18, the second RFID ring element 20, and/or the resonant antenna 22 are carried by or operatively attached to objects. The objects can carry the components via various techniques such as by way of adhesives, epoxy, screws, rivets, cable ties, or some other attachment technique. The objects can be any number of physical items and things, depending on the application. In this regard, as used herein, the term "object" and its grammatical variations are intended to have an expansive meaning that refers to physical objects that connect or join together. Examples of objects include electrical connectors, attachment members of structural assemblies, and pipeline segments, among many other possibilities. In an embodiment, one of the objects is a stationary object 58 and another of the objects is a moveable object 60. The stationary object 58 and moveable object 60 can join or be put together in various applications to make a connection between them, according to an embodiment. The moveable object 60 can move with respect to the stationary object 58.

In the example application presented in FIG. 2, the stationary object 58 is a first pipeline segment 62 and the moveable object 60 is a second pipeline segment 64. The first pipeline segment 62 remains stationary while the second pipeline segment 64 is moved toward the first pipeline segment 62 for a connection to be made between them. The connection can be a fastening and clamping of the first and second pipeline segments 62, 64 together. In FIG. 2, the first substrate 54 is attached directly to the first pipeline segment 62, and the second substrate 56 is attached directly to the second pipeline segment 64. Accordingly, the first RFID ring element 18 and the resonant antenna 22 are attached to, and thereby carried by, the first pipeline segment 62, and the second RFID ring element 20 is likewise attached to, and thereby carried by, the second pipeline segment 64. The first RFID ring element 18 and resonant antenna 22 remain stationary with the first pipeline segment 62, while the second RFID ring element 20 moves with movement of the second pipeline segment 64.

When the first and second pipeline segments 62, 64 are brought together and the connection is made between them, the first substrate 54 and the second substrate 56 are concomitantly brought together. The second RFID ring element 20 is moved toward the resonant antenna 22 and toward the first RFID ring element 18 in the midst of connecting the first and second pipeline segments 62, 64. Once brought together, the first and second RFID ring elements 18, 20 and the resonant antenna 22 exhibit an arrangement resembling that presented in FIG. 1, and hence reside in operational proximity to one another. A first geometrical configuration $G_1$ and positioning is present between the first ring element 18 and the resonant antenna 22 with respect to each other, and a second geometrical configuration $G_2$ and positioning is present between the second ring element 20 and the resonant antenna 22 with respect to each other. According to the embodiment of FIG. 2, the first geometrical configuration $G_1$ is preestablished via placement of the first RFID ring element 18 and the resonant antenna 22 at the first substrate 54. The second geometrical configuration $G_2$, on the other hand, becomes established upon the connection being made between the first and second pipeline segments 62, 64, and the attendant bringing together or relative "connection" of the first and second substrates 54, 56. The first geometrical configuration $G_1$, per an embodiment, is an arrangement and positioning of the first RFID ring element 18 relative to the resonant antenna 22 that involves distances and orientation between the components. In a similar manner, the second geometrical configuration $G_2$, per this embodiment, is an arrangement and positioning of the second RFID ring element 20 relative to the resonant antenna 22 that involves distances and orientation between the components.

During use of the RFID-based assembly 10, it has been determined that a general symmetry among the first and second RFID ring elements 18, 20 and resonant antenna 22 serves to provide a shared and similar roundtrip RF propagation channel and path between the RFID reader 12 and the RFID-based assembly 10. In theory, a shared RF propagation path should provide response RF signals from the first and second RFID tags that have the same RF signal phase and same RF signal strength. But in practice, it has been observed that the RF signal phase and RF signal strength are not always precisely the same value, and rather are similar and corresponding in value. The general symmetry among the first and second RFID ring elements 18, 20 and resonant antenna 22 that provides the similar RF signal phase and strength can vary in different embodiments depending upon, among other potential factors, the designs and constructions and components of the first and second RFID ring elements 18, 20 and the resonant antenna 22.

In the embodiment of FIGS. 1 and 2, the general symmetry is between the first geometric configuration $G_1$ and the second geometrical configuration $G_2$. In particular, and with specific reference to FIG. 1, the general symmetry between the first and second geometrical configurations $G_1$, $G_2$ involves distances and orientations between the first electrically-conductive loop 24 and first RFID IC 26 and the central linear portion 44 of the dipole antenna 40. Likewise, the general symmetry between the first and second geometrical configurations $G_1$, $G_2$ involves distances and orientations between the second electrically-conductive loop 32 and second RFID IC 34 and the central linear portion 44 of the dipole antenna 40. The general symmetry is between: i) distances and orientations between the first electrically-conductive loop 24 and the first RFID IC 26 and the central linear portion 44, and ii) distances and orientations between the second electrically-conductive loop 32 and the second RFID IC 34 and the central linear portion 44. It has been found, according to certain embodiments, that these distances and orientations need not necessarily possess a precise equivalence relative to each other, and hence precise symmetry between the first and second geometrical configurations $G_1$, $G_2$ is not strictly necessary. Rather, a generally corresponding RF signal phase and RF signal strength can be provided, it has been shown, in the absence of precise equivalence and precise symmetry.

The RFID-based assembly 10 can be employed to ascertain a connection state among objects, to determine the location of objects, or to carry out both functions. In the example of FIGS. 1 and 2, once the first and second pipeline segments 62, 64 are connected together—and once the general symmetry among the first and second RFID ring elements 18, 20 and resonant antenna 22 is established—an RF signal phase difference and/or an RF signal strength difference between the first and second RFID tags can serve as an indication of the connection state and can be utilized for localization. Moreover, one or more extraneous RFID tags 66 in the field of view 16 can be distinguished from the first and second RFID tags based on the associated RF signal phase and strength differences. The extraneous RFID tag 66 is distanced remote of the first and second pipeline segments 62, 64, yet still resides within the field of view 16 of the RFID antenna 14. In an example simulation, and with particular reference to FIG. 2, RF signal phase and RF signal strength were observed for the first RFID tag of the first RFID ring element 18 and resonant antenna 22, for the second RFID tag of the second RFID ring element 20 and resonant antenna 22, and for the extraneous RFID tag 66. Table 1 presents results of the example simulation (still, other simulations may yield other results).

|  | Frequency (MHz) | Received Signal Strength Indication (RSSI) | RF Signal Phase |
| --- | --- | --- | --- |
| First RFID Tag | 902 | −52 | 84° |
| Second RFID Tag | 902 | −54 | 78° |
| Extraneous RFID Tag | 902 | −79 | 129° |
| First RFID Tag | 915 | −53 | 60° |
| Second RFID Tag | 915 | −50 | 58° |
| Extraneous RFID Tag | 915 | −59 | 100° |

With reference to Table 1, at an operational frequency of 902 megahertz (MHz), the RF signal strength (i.e., received signal strength indication or RSSI) difference between the first and second RFID tags was −2 decibels (dB), constituting a generally corresponding RF signal strength therebetween. In contrast, at 902 MHz, the RF signal strength difference between the first RFID tag and the extraneous RFID tag 66 was −27 dB, constituting non-correspondence therebetween. And at 902 MHz, the RF signal strength difference between the second RFID tag and the extraneous RFID tag 66 was −25 dB, again constituting non-correspondence therebetween. Further, at 902 MHz, the RF signal phase difference between the first and second RFID tags was 6°, constituting a generally corresponding RF signal phase therebetween. In contrast, at 902 MHz, the RF signal phase difference between the first RFID tag and the extraneous RFID tag 66 was 45°, constituting non-correspondence therebetween. And at 902 MHz, the RF signal phase difference between the second RFID tag and the extraneous RFID tag 66 was 51°, again constituting non-correspondence therebetween. Moreover, at an operational frequency of 915 MHz, the RF signal strength difference between the first and second RFID tags was −3 dB, constituting a generally corresponding signal strength therebetween. In contrast, at 915 MHz, the RF signal strength difference between the first RFID tag and the extraneous RFID tag 66 was −6 dB, constituting non-correspondence therebetween. And at 915 MHz, the RF signal strength difference between the second RFID tag and the extraneous RFID tag 66 was −9 dB, again constituting non-correspondence therebetween. Further, at 915 MHz, the RF signal phase difference between the first and second RFID tags was 2°, constituting a generally corresponding RF signal phase therebetween. In contrast, at 915 MHz, the RF signal phase difference between the first RFID tag and the extraneous RFID tag 66 was 40°, constituting non-correspondence therebetween. And at 915 MHz, the RF signal phase difference between the second RFID tag and the extraneous RFID tag 66 was 42°, again constituting non-correspondence therebetween. The operational frequencies 902 MHz and 915 MHz constitute operational frequencies within an RFID operational band, per this example.

In an embodiment, the connection state of the first and second pipeline segments 62, 64—i.e., whether the first and second pipeline segments 62, 64 are connected or disconnected—can be based on the RF signal phase differences and/or on the RF signal strength differences between the first and second RFID tags. Using the simulation results of Table 1 as an example, the generally corresponding RF signal strengths of the first and second RFID tags can serve as an indication that a connection has indeed been made between the first and second pipeline segments 62, 64. Conversely, non-corresponding RF signal strengths of the first and second RFID tags can serve as an indication that a connection is lacking between the first and second pipeline segments 62, 64. Moreover, in combination with the RF signal strengths or as the sole indicium—depending on the embodiment—the generally corresponding RF signal phases of the first and second RFID tags can serve as an indication that a connection has indeed been made between the first and second pipeline segments 62, 64. Conversely, non-corresponding RF signal phases of the first and second RFID tags can serve as an indication that a connection is lacking between the first and second pipeline segments 62, 64. Still, other thresholds of RF signal strength and RF signal phase correspondence and non-correspondence may be suitable in other embodiments.

Furthermore, in an embodiment, the localization of the first and second pipeline segments 62, 64 can be determined and can be based on the RF signal phase differences and/or on the RF signal strength differences between the first and second RFID tags. For this determination, and according to an embodiment, a location of the stationary first pipeline segment 62 is known, while the location of the moveable second pipeline segment 64 is at least initially unknown when the first and second pipeline segments 62, 64 are disconnected. Still, in other embodiments, the known location can be with regard to other components of the RFID-based assembly 10. Using the simulation results of Table 1 as an example, when it has been ascertained that a connection is made between the first and second pipeline segments 62, 64—whether based on the RF signal phase differences and/or on the RF signal strength differences—the location of the second pipeline segment 64 can be determined in view of the known location of the first pipeline segment 62. Moreover, response RF signals from the extraneous RFID tag 66 can be disregarded and will not hinder the connection ascertainment and localization, according to this embodiment. The non-correspondence and increased RF signal strength differences and increased RF signal phase differences can serve as an indication of an extraneous RFID tag such as the extraneous RFID tag 66 amid the ascertainment of connection and localization.

In further embodiments, the RFID-based assembly 10 can be used to ascertain connection states and to determine the locations of a multitude of objects. For instance, in relation to the embodiment of FIGS. 1 and 2, more than one stationary pipeline segment (e.g., 62a, 62b, etc.) could each be outfitted with first RFID ring element 18 and the resonant antenna 22, and more than one moveable pipeline segment (e.g., 64a, 64b, etc.) could each be outfitted with second RFID ring element 20. When the additional stationary pipeline segments 62 and additional moveable pipeline segments 64 are brought together, a multitude of associated general symmetries are established thereamong, thereby providing multiple RF signal strengths and RF signal phases that generally correspond. The general correspondences can be used to ascertain connection states and determine locations of the numerous stationary and moveable pipeline segments 62, 64, as described above.

Furthermore, a second embodiment of the RFID-based assembly is presented in FIG. 3. In the second embodiment, corresponding components and elements are numbered similarly but with numerals 1xx when referring to this second embodiment. For example, the RFID-based assembly is referenced by numeral 10 in the first embodiment, and it is correspondingly referenced by numeral 110 in the second embodiment. Moreover, similarities may exist between the first embodiment and the second embodiment, some of which may not be repeated here in the description of the second embodiment.

With reference to FIG. 3, the second embodiment of the RFID-based assembly 110 includes a first RFID ring element 118, a second RFID ring element 120, and a resonant antenna 122. Still, the RFID-based assembly 110 could have more, less, and/or different components in other embodiments. As before, the first RFID ring element 118 includes a first electrically-conductive loop 124 and a first RFID IC 126 that are electrically coupled together, and the second RFID ring element 120 includes a second electrically-conductive loop 132 and a second RFID IC 134 that are electrically coupled together. Further, as before, the resonant antenna 122 makes up a part of both the associated first and second RFID tags when operational proximity is present with the first and second RFID ring elements 118, 120 relative to the resonant antenna 122. Unlike the first embodiment, the resonant antenna 122 of the second embodiment is in the form of a patch antenna 168. The patch antenna 168, in this embodiment, has a rectangular shape and, although not specifically depicted in FIG. 3, has a microstrip patch structure that resonates upon interrogation by the RFID reader 12. The patch antenna 168 has a first terminal side 170 and an opposite, second terminal side 172. In the second embodiment, the general symmetry that provides the generally corresponding RF signal strengths and phases is between first and second geometrical configurations $G_1$, $G_2$, involves distances and orientations between the first electrically-conductive loop 124 and first RFID IC 126 and the first terminal side 170, and involves distances and orientations between the second electrically-conductive loop 132 and second RFID IC 134 and the second terminal side 172. Lastly, the first RFID ring element 118, the second RFID ring element 120, and/or the patch antenna 168 could be carried by various objects.

Figure 4:
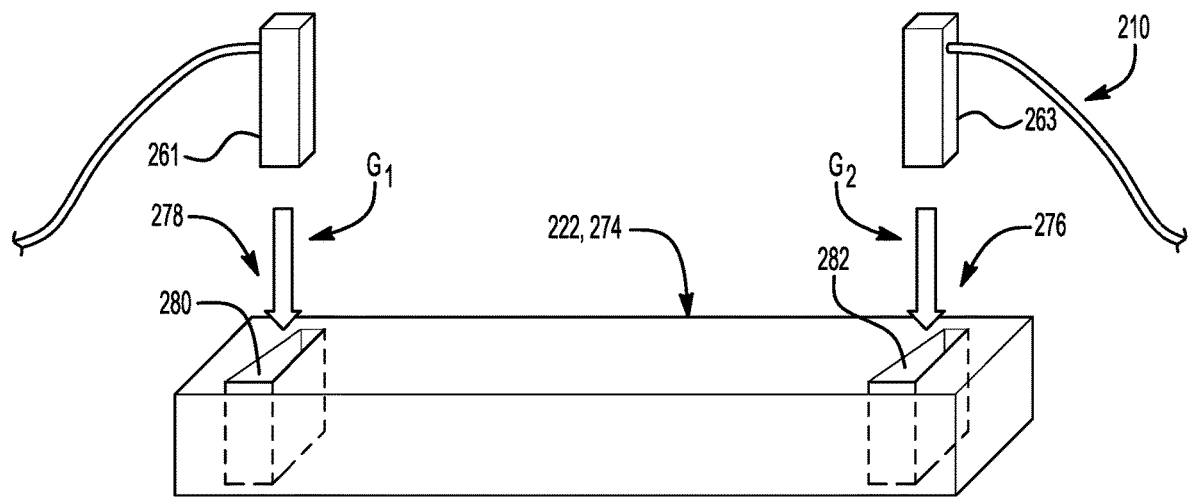
FIG. 4 is a schematic of yet another embodiment of an RFID-based assembly.

A third embodiment of the RFID-based assembly is presented in FIG. 4. In the third embodiment, corresponding components and elements are numbered similarly but with numerals 2xx when referring to this third embodiment. For example, the RFID-based assembly is referenced by numeral 210 in the third embodiment. Moreover, similarities may exist between the first embodiment and the third embodiment, some of which may not be repeated here in the description of the third embodiment. With reference to FIG. 4, the RFID-based assembly 210 includes a first holder 261, a second holder 263, and a resonant antenna 222. Still, the RFID-based assembly 210 could have more, less, and/or different components in other embodiments. The first moveable object 261 carries a first RFID ring element (not shown), and the second moveable object 263 carries a second RFID ring element (not shown. The first and second RFID ring elements include first and second electrically-conductive loops and first and second RFID ICs, as previously described. The first holder 261 can be tethered to, and itself carried by, a first object that could be a stationary object or moveable object; and the second holder 263 can be tethered to, and itself carried by, a second object that could be the opposite type of object, either moveable or stationary. In this regard, the RFID-based assembly 210 can be employed with objects that—due to their constructions and/or for other reasons—otherwise present challenges in establishing the general symmetry that provides the generally corresponding RF signal strengths and phases. The resonant antenna 222 is in the form of a patch antenna 274. The patch antenna 274 has a microstrip patch structure that resonates upon interrogation by the RFID reader 12.

The third embodiment of the RFID-based assembly 210 is designed and constructed with packaging that more readily facilitates the general symmetry that provides the generally corresponding RF signal strengths and RF signal phases. In this embodiment, a first alignment formation 278 is established between the first holder 261 and the patch antenna 274, and a second alignment formation 276 is established between the second holder 263 and the patch antenna 274. The first alignment formation 278 can serve to furnish, in a sense, an automatic alignment of the first holder 261 and the patch antenna 274, and hence alignment of the first RFID ring element relative to the patch antenna 274. In a similar fashion, the second alignment formation 276 can serve to furnish, in a sense, an automatic alignment of the second holder 263 and the patch antenna 274, and hence alignment of the second RFID ring element relative to the patch antenna 274. These alignments establish the general symmetry for the generally corresponding RF signal strengths and phases. The first and second alignment formations 278, 276 can have various designs, constructions, and components, depending on the embodiment.

In the third embodiment of FIG. 4, the first and second alignment formations 278, 276 are in the form of projection-recess interfitting constructions between the first and second holders 261, 263, respectively and the patch antenna 274. The first and second holders 261, 263 could snap-in place, for example. In particular, a first slot 280 is defined and resides in the patch antenna 274 at one side thereof, and a second slot 282 is defined and resides in the patch antenna 274 at an opposite side thereof. The first holder 261 is placed and received in the first slot 280 when brought together with the patch antenna 274, and the second holder 263 is similarly placed and received in the second slot 282 when brought together with the patch antenna 274. The first slot 280 is shaped and sized to accommodate the reception of holder 261, and the second slot 282 is shaped and sized to accommodate the reception of holder 263. In the third embodiment, the general symmetry that provides the generally corresponding RF signal strengths and phases is between first and second geometrical configurations $G_1$, $G_2$ among the respective first holder 261 and first slot 280 and the second holder 263 and second slot 282. Still, other embodiments of the alignment formations could involve magnetic elements, could involve leveraging gravitational attraction among the associated objects, and/or could involve hook-and-loop fasteners, all in order to facilitate the general symmetry that provides the generally corresponding RF signal strengths and phases.

Figure 5:
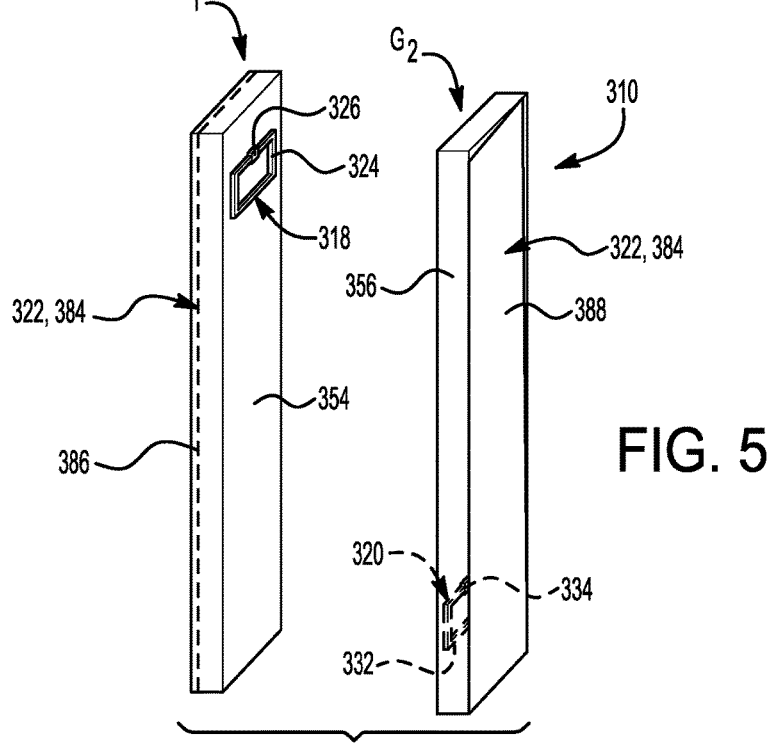
FIG. 5 is a schematic of yet another embodiment of an RFID-based assembly.
Figure 6:
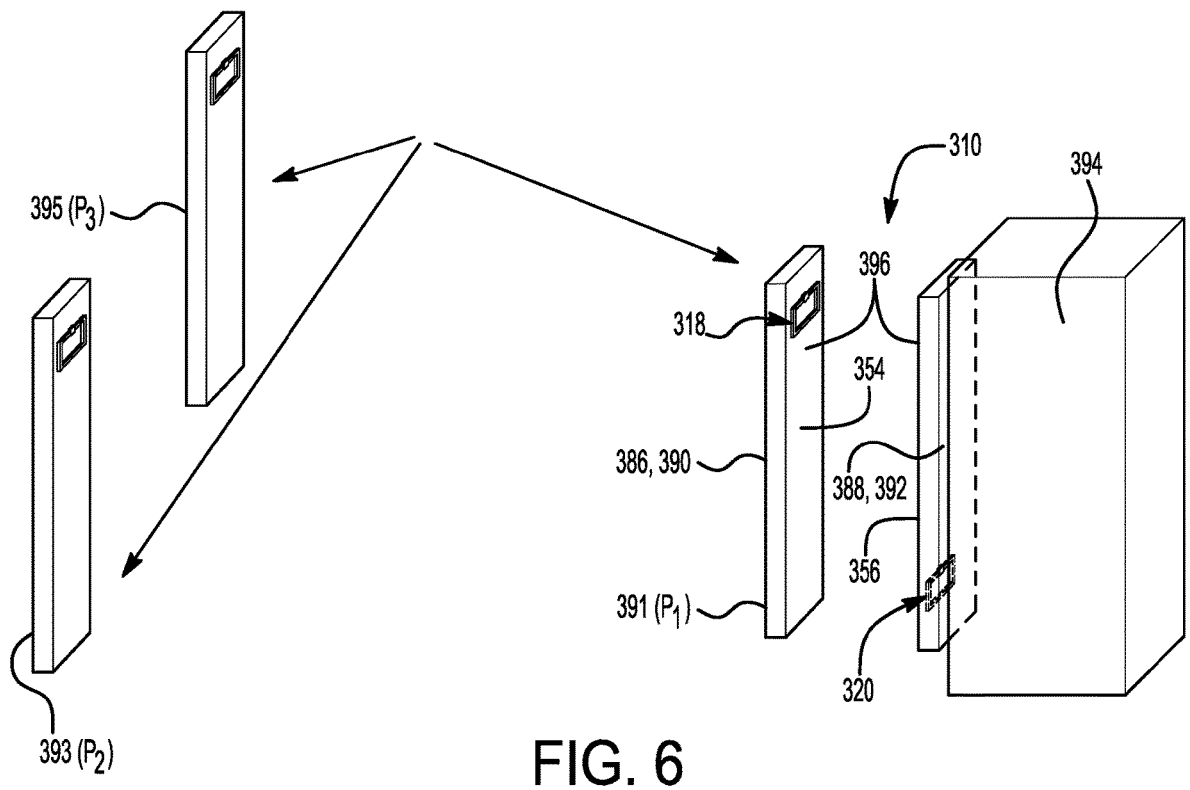
FIG. 6 illustrates an exemplary application of the RFID-based assembly of FIG. 5.

Continuing with examples, a fourth embodiment of the RFID-based assembly is presented in FIGS. 5 and 6. In the fourth embodiment, corresponding components and elements are numbered similarly but with numerals 3xx when referring to this fourth embodiment. For example, the RFID-based assembly is referenced by numeral 310 in the fourth embodiment. Moreover, similarities may exist between the first embodiment and the fourth embodiment, some of which may not be repeated here in the description of the fourth embodiment. With reference to FIG. 5, the fourth embodiment of the RFID-based assembly 310 includes a first RFID ring element 318, a second RFID ring element 320, and a resonant antenna 322. Still, the RFID-based assembly 310 could have more, less, and/or different components in other embodiments. As before, the first RFID ring element 318 includes a first electrically-conductive loop 324 and a first RFID IC 326 that are electrically coupled together, and the second RFID ring element 320 includes a second electrically-conductive loop 332 and a second RFID IC 334 that are electrically coupled together.

Unlike previous embodiments, the resonant antenna 322 is in the form of a two-part resonant antenna 384. The two-part resonant antenna 384 includes a first segment part 386 and a second segment part 388 that mate and come together to construct the resonant antenna 322. When constructed, the resonant antenna 322 is able to radiate RF signals when subject to interrogation by the RFID reader 12 for electromagnetic energy coupling to the first and second electrically-conductive loops 324, 332 and energization of the first and second RFID ICs 326, 334. The first segment part 386 is in the form of an electrically-conductive layer that can be composed of a high conductivity metal such as a copper metal. Likewise, the second segment part 388 is in the form of an electrically-conductive layer that can be composed of a high conductivity metal such as a copper metal. The first and second segment parts 386, 388 have the same design and construction with respect to each other, according to this embodiment. A first substrate 354 carries the first RFID ring element 318 and carries the first segment part 386, and a second substrate 356 carries the second RFID ring element 320 and carries the second segment part 388. The first RFID ring element 318 is located on a first side of the first substrate 354, and the first segment part 386 is located on an opposite, second side of the first substrate 354. The second RFID ring element 320 is located on a first side of the second substrate 356, and the second segment part 388 is located on an opposite, second side of the second substrate 356.

With particular reference now to FIGS. 5 and 6, an example space vehicle and spacecraft application is depicted. Here, the first segment part 386 is a stationary base segment part 390 of the larger two-part resonant antenna 384 shown in FIG. 5. The first RFID ring element 318 and first substrate 354 are hence also stationary. The second segment part 388, on the other hand, is a moveable segment part 392 of the two-part resonant antenna 384. The second RFID ring element 320 and second substrate 356 are hence also moveable. Like previous embodiments, the first RFID ring element 318, the second RFID ring element 320, and the resonant antenna 322 are carried by objects. In this fourth embodiment, the stationary base segment part 390, the first RFID ring element 318, and the first substrate 354 can have an attachment to a surface, wall, shelving, or something else. The moveable segment part 392 can have an attachment to an asset such as a cargo 394. In use, the stationary base segment part 390 and moveable segment part 392 are connected together. The connection can be made via hook-and-loop fasteners on confronting sides 396 thereof, among other types of possible attachment techniques. When the connection is made, the general symmetry that provides the generally corresponding RF signal strengths and phases is between first and second geometrical configurations $G_1$, $G_2$, involves distances and orientations between the first electrically-conductive loop 324 and first RFID IC 326 and the first and second segment parts 386, 388, and involves distances and orientations between the second electrically-conductive loop 332 and second RFID IC 334 and the first and second segment parts 386, 388.

Moreover, in the fourth embodiment, there could be multiple stationary base segment parts at different locations and of different positions for accepting connection with the moveable segment part 392. The moveable segment part 392 and the cargo 394 could hence be moved place-to-place and connected among the stationary base segment parts, as desired. The stationary base segment parts can have the same designs, constructions, and components relative to one another. With particular reference to FIG. 6, in this example, a first stationary base segment part 391 is located at a first position $P_1$, a second stationary base segment part 393 is located at a second position $P_2$, and a third stationary base segment part 395 is located at a third position $P_3$. The first, second, and third positions P1, $P_2$, $P_3$ have known locations, according to this embodiment, for the purposes of determining location, as previously described. The moveable segment part 392 and cargo 394 can be moved to any one of the first, second, or third positions P1, $P_2$, $P_3$ during use, and can be connected with any one of the first, second, or third stationary base segment parts 391, 393, 395.

Still, other embodiments and other applications are possible for the RFID-based assembly. For instance, the RFID-based assembly could be utilized for connection ascertainment and localization of wine bottles in a wine cellar. Here, numerous second RFID ring elements could be carried by numerous wine bottles, and numerous first RFID ring elements and resonant antennas could be carried at individual wine cellar rack locations. When a wine bottle is placed in an associated rack location, the accompanying second RFID ring element can come within operational proximity of the accompanying first RFID ring element and resonant antenna for connection ascertainment and localization, as set forth above. A connection could be made between objects carrying the second RFID ring element and carrying the first RFID ring element and resonant antenna. In another exemplary embodiment and application, the RFID-based assembly could be utilized for connection ascertainment and localization of items placed at locations on a shelving unit.

Figure 7:
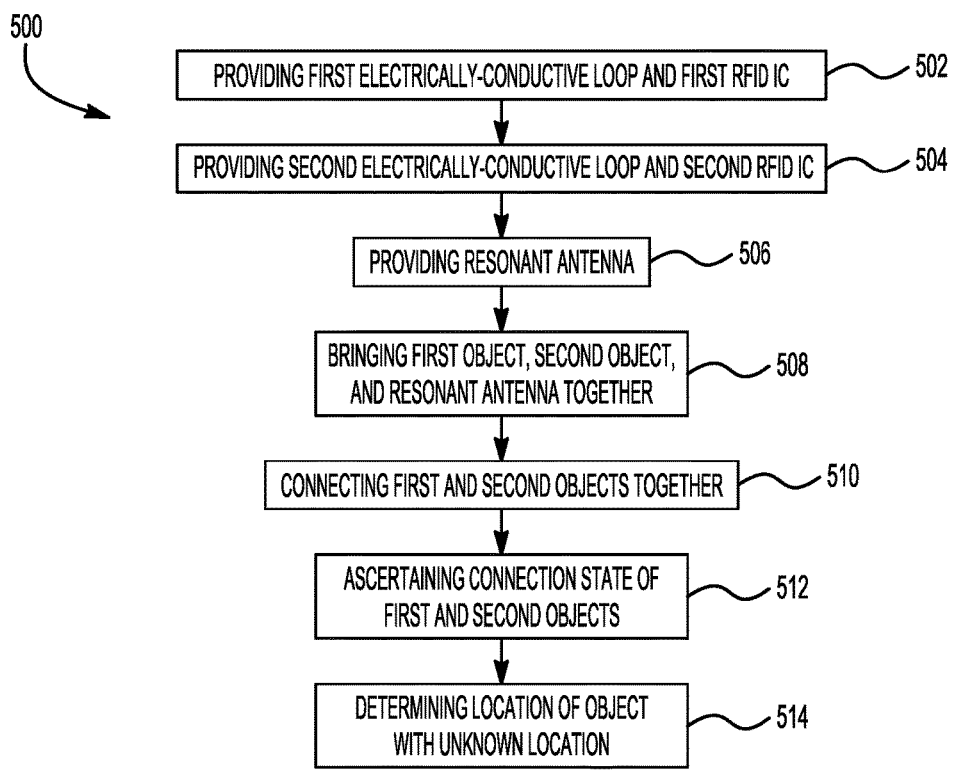
FIG. 7 is a flow chart of an embodiment of a RFID-enabled method.

An embodiment of a RFID-based method 500 is presented in flow chart format in FIG. 7. The RFID-based method 500 includes a multitude of steps. According to this embodiment, a first step 502 involves providing the first electrically-conductive loop and the first RFID IC carried by a first object. A second step 504 involves providing the second electrically-conductive loop and the second RFID IC carried by a second object. A third step 506 involves providing a resonant antenna. Further, a fourth step 508 involves bringing the first object, the second object, and the resonant antenna together. A fifth step 510 involves connecting the first object and the second object to each other. And a sixth step 512 involves ascertaining the connection state of the first object and the second object. Lastly, per this embodiment, a seventh step 514 involves determining the location of the first object or the second object, whichever of the two objects has a location that is unknown. Still, the RFID-based method 500 could have more, less, and/or different steps in other embodiments, and the steps could be executed in orders that differ from those set forth in FIG. 7.

With reference now to FIGS. 8-12, simulated testing was conducted in order to assess the effectiveness of the RFID-based assembly and method for ascertaining connection states among RFID tags. The results are presented in FIGS. 8-12. The simulated testing employed a single RFID reader 612 and RFID antenna 614, and it involved a habitat scattering environment. In the simulated testing, RFID tags had equidistant locations from the RFID reader 612 and RFID antenna 614. In FIGS. 8-12, a first RFID tag is denoted D20, a second RFID tag is denoted D21, a third RFID tag is denoted D23, and a fourth RFID tag is denoted D24. The first RFID tag D20 and third RFID tag D23 exhibited an equidistant arrangement from the RFID antenna 614, and likewise the second RFID tag D21 and fourth RFID tag D24 exhibited an equidistant arrangement from the RFID antenna 614. The first RFID tag D20 included a first RFID ring element 618, and the second RFID tag D21 included a second RFID ring element 620. A resonant antenna 622 was situated between the first and second RFID tags D20, D21. The third RFID tag D23 included a first RFID ring element 619, and the fourth RFID tag D24 included a second RFID ring element 621. A resonant antenna 623 was situated between the third and fourth RFID tags D23, D24. An average RF signal phase difference among the first, second, third, and fourth RFID tags D20, D21, D23, D24 was observed, and is displayed by FIGS. 8-12. Whether a connected or disconnected state existed was based on the value of the average RF signal phase difference. Still, other simulations may yield other results.

Figure 8:
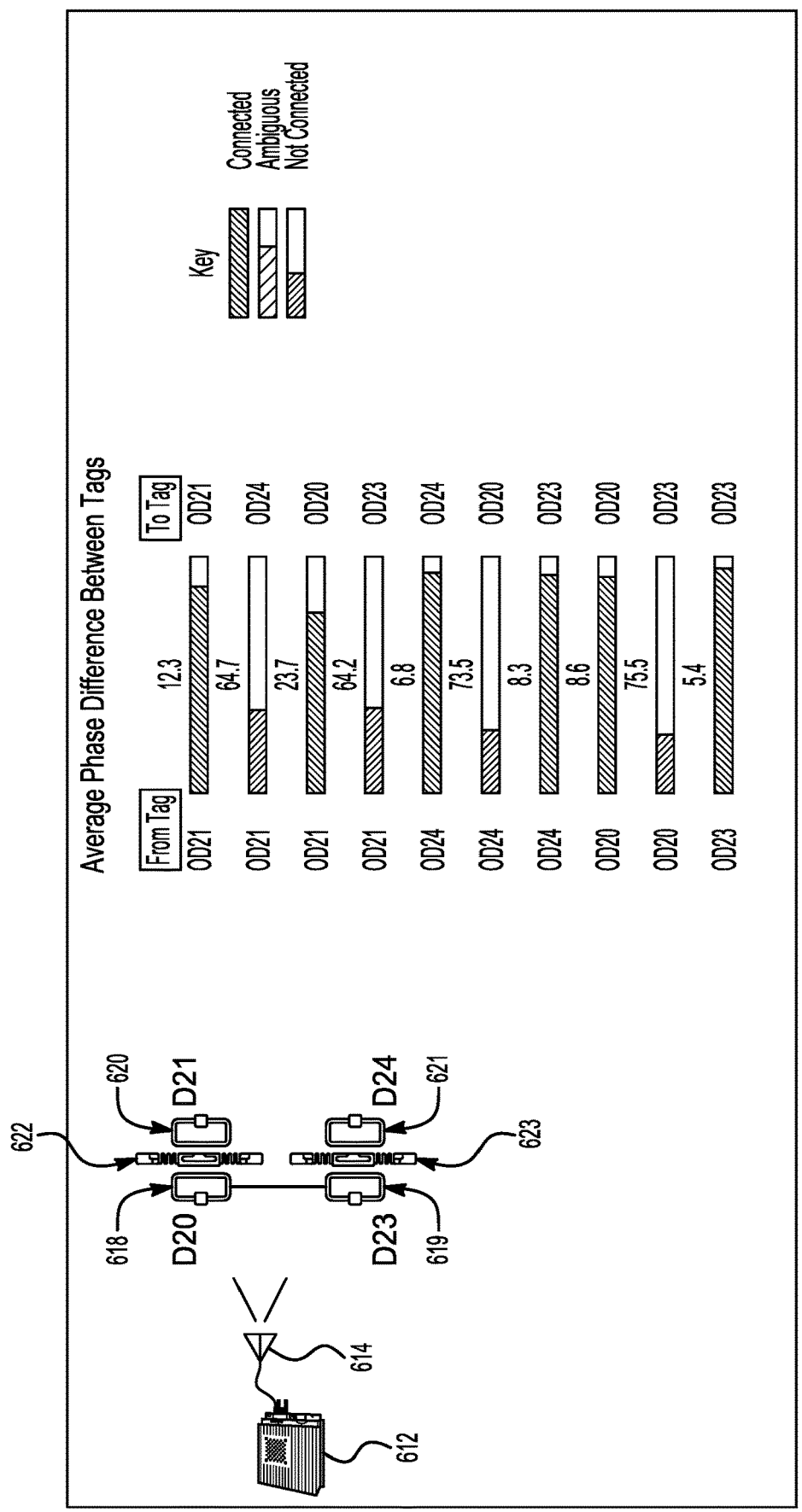
FIG. 8 presents a first set of simulated testing results of average RF signal phase differences between certain RFID tags.

As demonstrated in FIG. 8, an average RF signal phase difference from the second RFID tag D21 and to the second RFID tag D21 was observed to be 12.3°, constituting a connected state. From the second RFID tag D21 to the fourth RFID tag D24, an average RF signal phase difference was observed to be 64.7°, constituting a disconnected state. From the second RFID tag D21 to the first RFID tag D20, an average RF signal phase difference was observed to be 23.7°, constituting a connected state. From the second RFID tag D21 to the third RFID tag D23, an average RF signal phase difference was observed to be 64.2°, constituting a disconnected state. From the fourth RFID tag D24 to the fourth RFID tag D24, an average RF signal phase difference was observed to be 6.8°, constituting a connected state. From the fourth RFID tag D24 to the first RFID tag D20, an average RF signal phase difference was observed to be 73.5°, constituting a disconnected state. From the fourth RFID tag D24 to the third RFID tag D23, an average RF signal phase difference was observed to be 8.3°, constituting a connected state. From the first RFID tag D20 to the first RFID tag D20, an average RF signal phase difference was observed to be 8.6°, constituting a connected state. From the first RFID tag D20 to the third RFID tag D23, an average RF signal phase difference was observed to be 75.5°, constituting a disconnected state. Lastly, from the third RFID tag D23 to the third RFID tag D23, an average RF signal phase difference was observed to be 5.4°, constituting a connected state.

Figure 9:
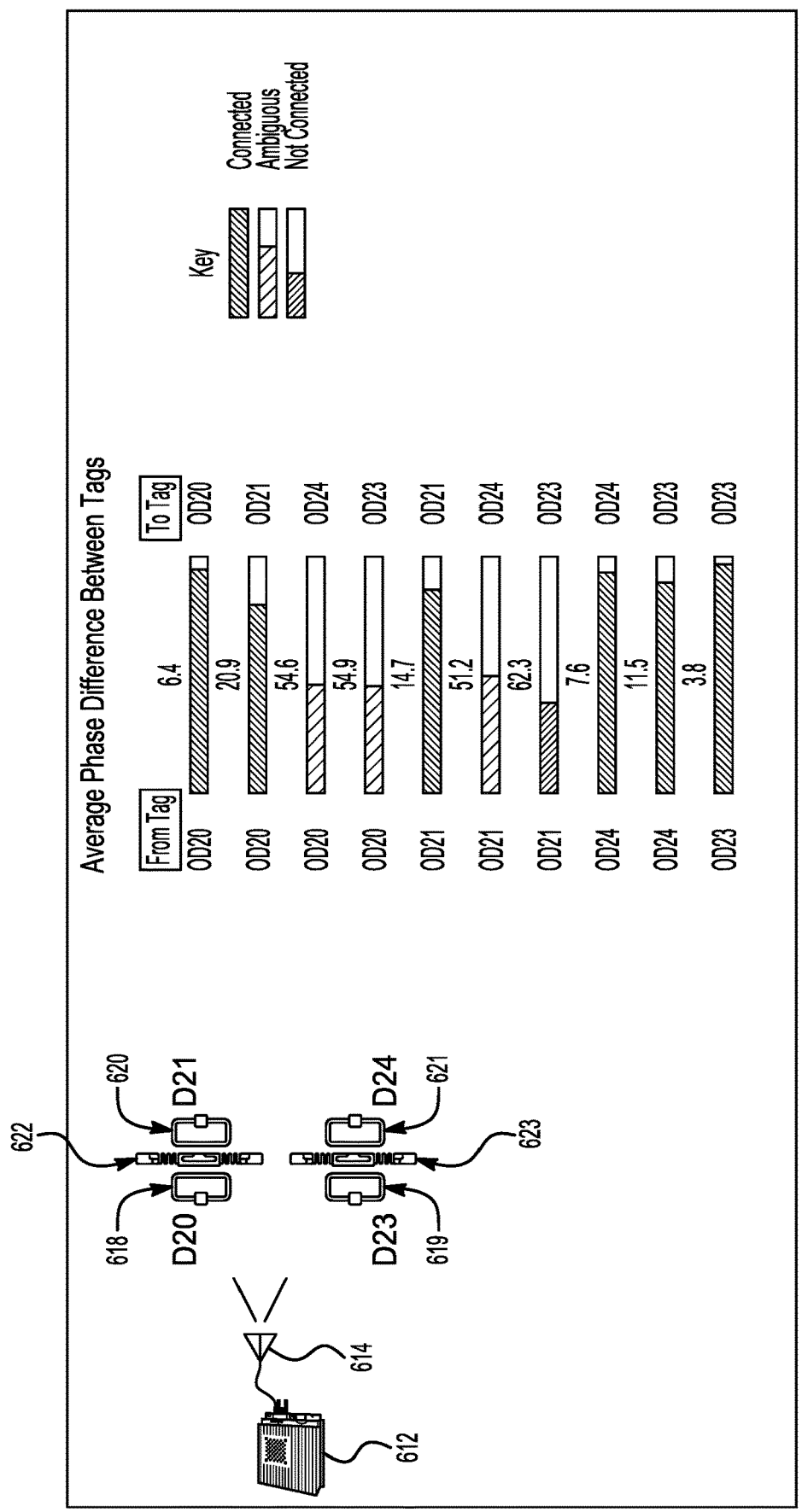
FIG. 9 presents a second set of simulated testing results of average RF signal phase differences between certain RFID tags.

As demonstrated in FIG. 9, an average RF signal phase difference from the first RFID tag D20 and to the first RFID tag D20 was observed to be 6.4°, constituting a connected state. From the first RFID tag D20 to the second RFID tag D21, an average RF signal phase difference was observed to be 20.9°, constituting a connected state. From the first RFID tag D20 to the fourth RFID tag D24, an average RF signal phase difference was observed to be 54.6°, constituting an ambiguous state. From the first RFID tag D20 to the third RFID tag D23, an average RF signal phase difference was observed to be 54.9°, constituting an ambiguous state. From the second RFID tag D21 to the second RFID tag D21, an average RF signal phase difference was observed to be 14.7°, constituting a connected state. From the second RFID tag D21 to the fourth RFID tag D24, an average RF signal phase difference was observed to be 51.2°, constituting an ambiguous state. From the second RFID tag D21 to the third RFID tag D23, an average RF signal phase difference was observed to be 62.3°, constituting a disconnected state. From the fourth RFID tag D24 to the fourth RFID tag D24, an average RF signal phase difference was observed to be 7.6°, constituting a connected state. From the fourth RFID tag D24 to the third RFID tag D23, an average RF signal phase difference was observed to be 11.5°, constituting a connected state. Lastly, from the third RFID tag D23 to the third RFID tag D23, an average RF signal phase difference was observed to be 3.8°, constituting a connected state.

Figure 10:
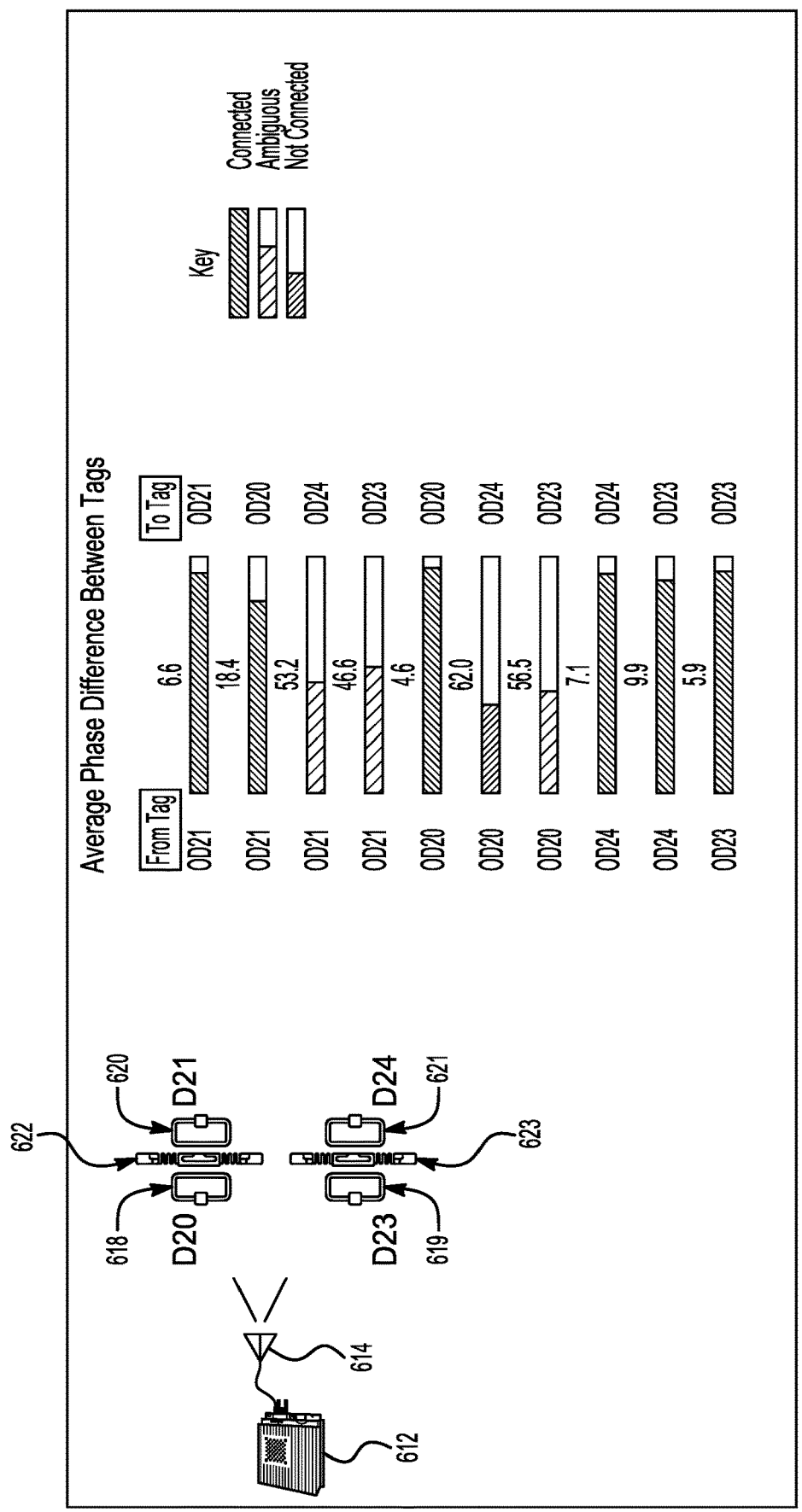
FIG. 10 presents a third set of simulated testing results of average RF signal phase differences between certain RFID tags.

As demonstrated in FIG. 10, an average RF signal phase difference from the second RFID tag D21 and to the second RFID tag D21 was observed to be 6.6°, constituting a connected state. From the second RFID tag D21 to the first RFID tag D20, an average RF signal phase difference was observed to be 18.4°, constituting a connected state. From the second RFID tag D21 to the fourth RFID tag D24, an average RF signal phase difference was observed to be 53.2°, constituting an ambiguous state. From the second RFID tag D21 to the third RFID tag D23, an average RF signal phase difference was observed to be 46.6°, constituting an ambiguous state. From the first RFID tag D20 to the first RFID tag D20, an average RF signal phase difference was observed to be 4.6°, constituting a connected state. From the first RFID tag D20 to the fourth RFID tag D24, an average RF signal phase difference was observed to be 62.0°, constituting a disconnected state. From the first RFID tag D20 to the third RFID tag D23, an average RF signal phase difference was observed to be 56.5°, constituting an ambiguous state. From the fourth RFID tag D24 to the fourth RFID tag D24, an average RF signal phase difference was observed to be 7.1°, constituting a connected state. From the fourth RFID tag D24 to the third RFID tag D23, an average RF signal phase difference was observed to be 9.9°, constituting a connected state. Lastly, from the third RFID tag D23 to the third RFID tag D23, an average RF signal phase difference was observed to be 5.9°, constituting a connected state.

Figure 11:
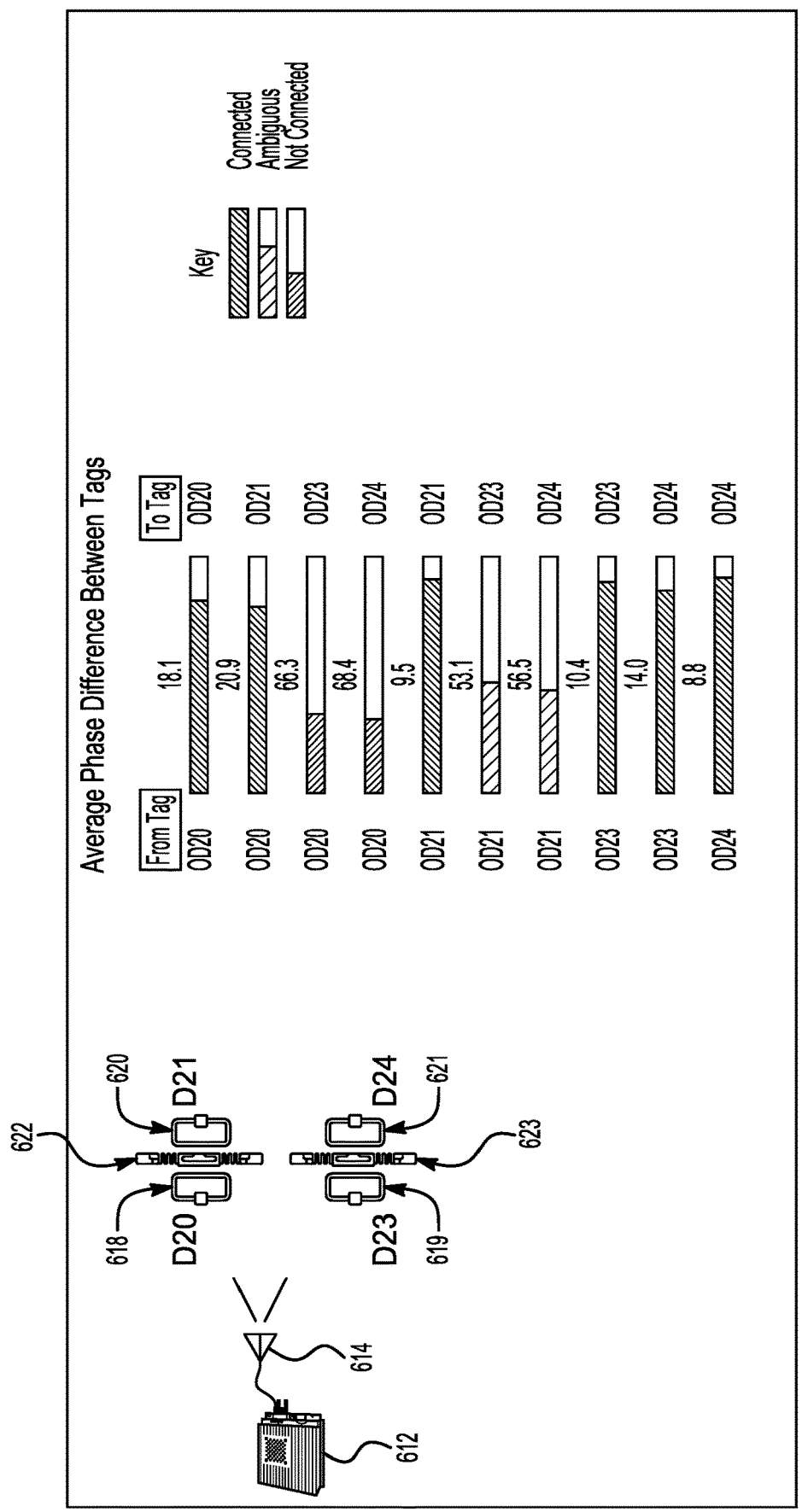
FIG. 11 presents a fourth set of simulated testing results of average RF signal phase differences between certain RFID tags.

As demonstrated in FIG. 11, an average RF signal phase difference from the first RFID tag D20 and to the first RFID tag D20 was observed to be 18.1°, constituting a connected state. From the first RFID tag D20 to the second RFID tag D21, an average RF signal phase difference was observed to be 20.9°, constituting a connected state. From the first RFID tag D20 to the third RFID tag D23, an average RF signal phase difference was observed to be 66.3°, constituting a disconnected state. From the first RFID tag D20 to the fourth RFID tag D24, an average RF signal phase difference was observed to be 68.4°, constituting a disconnected state. From the second RFID tag D21 to the second RFID tag D21, an average RF signal phase difference was observed to be 9.5°, constituting a connected state. From the second RFID tag D21 to the third RFID tag D23, an average RF signal phase difference was observed to be 53.1°, constituting an ambiguous state. From the second RFID tag D21 to the fourth RFID tag D24, an average RF signal phase difference was observed to be 56.5°, constituting an ambiguous state. From the third RFID tag D23 to the third RFID tag D23, an average RF signal phase difference was observed to be 10.4°, constituting a connected state. From the third RFID tag D23 to the fourth RFID tag D24, an average RF signal phase difference was observed to be 14.0°, constituting a connected state. Lastly, from the fourth RFID tag D24 to the fourth RFID tag D24, an average RF signal phase difference was observed to be 8.8°, constituting a connected state.

Figure 12:
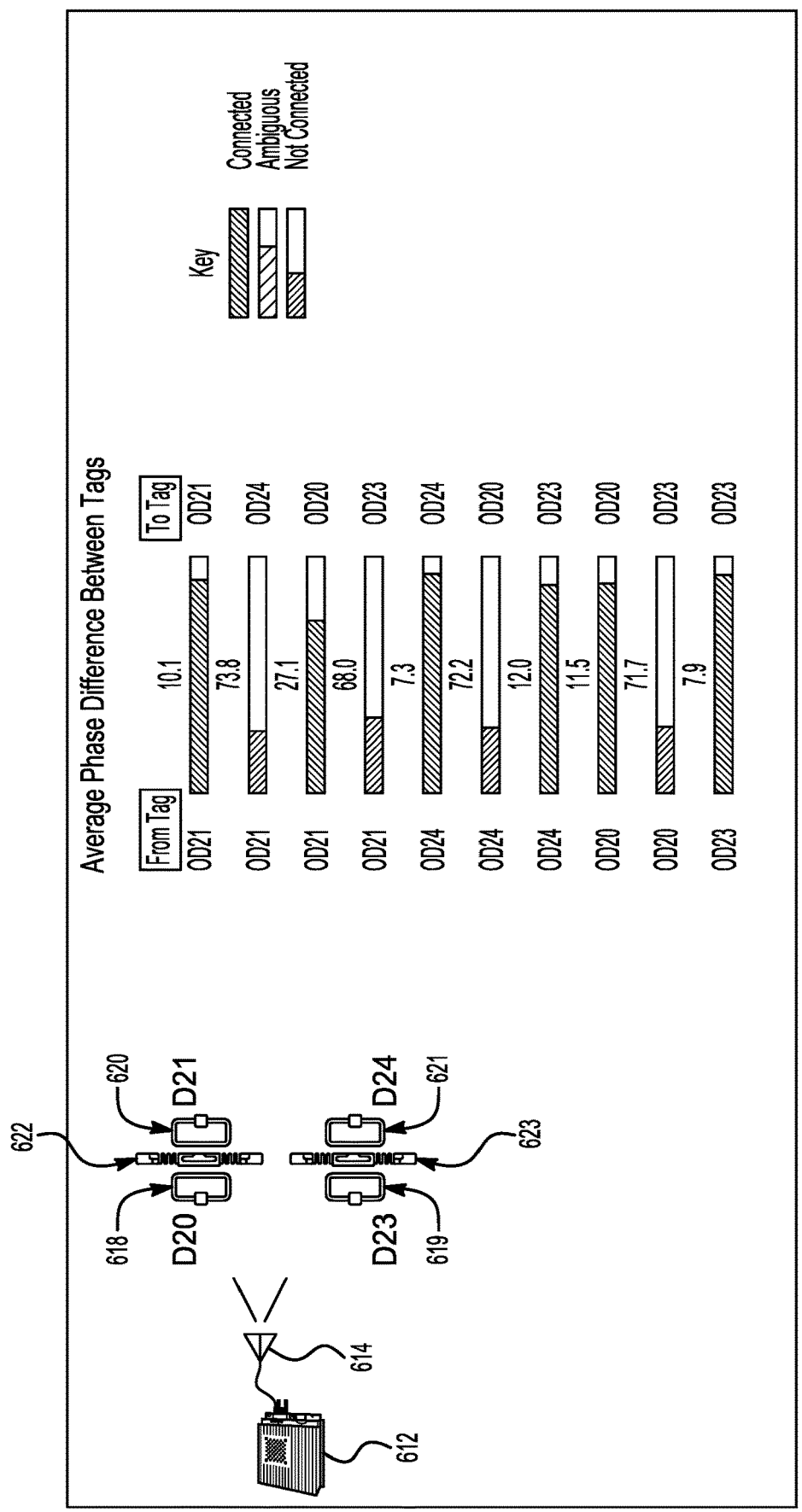
FIG. 12 presents a fifth set of simulated testing results of average RF signal phase differences between certain RFID tags.

As demonstrated in FIG. 12, an average RF signal phase difference from the second RFID tag D21 and to the second RFID tag D21 was observed to be 10.1°, constituting a connected state. From the second RFID tag D21 to the fourth RFID tag D24, an average RF signal phase difference was observed to be 73.8°, constituting a disconnected state. From the second RFID tag D21 to the first RFID tag D20, an average RF signal phase difference was observed to be 27.1°, constituting a connected state. From the second RFID tag D21 to the third RFID tag D23, an average RF signal phase difference was observed to be 68.0°, constituting a disconnected state. From the fourth RFID tag D24 to the fourth RFID tag D24, an average RF signal phase difference was observed to be 7.3°, constituting a connected state. From the fourth RFID tag D24 to the first RFID tag D20, an average RF signal phase difference was observed to be 72.2°, constituting a disconnected state. From the fourth RFID tag D24 to the third RFID tag D23, an average RF signal phase difference was observed to be 12.0°, constituting a connected state. From the first RFID tag D20 to the first RFID tag D20, an average RF signal phase difference was observed to be 11.5°, constituting a connected state. From the first RFID tag D20 to the third RFID tag D23, an average RF signal phase difference was observed to be 71.7°, constituting a disconnected state. Lastly, from the third RFID tag D23 to the third RFID tag D23, an average RF signal phase difference was observed to be 7.9°, constituting a connected state.

Still, other embodiments of the RFID-based method and assembly could combine designs, constructions, and components of the first, second, third, and fourth embodiments together.

In yet further embodiments, the RFID-based assembly could have multiple (i.e., greater than two) RFID tags with electrically-conductive loops and RFID ICs residing in operational proximity of a single resonant antenna. Here, the RFID tags and accompanying electrically-conductive loops and RFID ICs could be generally symmetrically disposed and arranged rotationally and circumferentially around a centrally-residing resonant antenna, once the many connections are made. In this regard, multiple connections among multiple objects could be ascertained and/or locations of the objects could be determined.

As used herein, the terms "general" and "generally" are intended to account for the inherent degree of variance and imprecision that is often attributed to, and often accompanies, any design and manufacturing process, including engineering tolerances—and without deviation from the relevant functionality and outcome—such that mathematical precision and exactitude is not implied and, in some instances, is not possible. In this regard, and per an example, the phrase "general symmetry" and its grammatical variations are not intended to require mathematically precise and exact symmetry between the first and second geometrical configurations. Per another example, the phrase "generally corresponding" and its grammatical variations are not intended to require mathematically precise and exact formations between the first and second electrically-conductive loops and RFID ICs. In other instances, the terms "general" and "generally" are intended to represent the inherent degree of uncertainty that is often attributed to any quantitative comparison, value, and measurement calculation, or other representation. In this regard, and per an example, the phrase "generally corresponding" and its grammatical variations are intended to represent the inherent degree of uncertainty of the quantitative comparison of RF signal phases and RF signal strengths.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A radio-frequency identification (RFID)-based method, the RFID-based method comprising:
   providing a first electrically-conductive loop and a first RFID integrated circuit (IC) electrically coupled with the first electrically-conductive loop, the first electrically-conductive loop and the first RFID IC being carried by a first object;
   providing a second electrically-conductive loop and a second RFID IC electrically coupled with the second electrically-conductive loop, the second electrically-conductive loop and the second RFID IC being carried by a second object;
   providing a resonant antenna;
   bringing the first object, the second object, and the resonant antenna within proximity of one another, wherein the first electrically-conductive loop and the first RFID IC have a first geometrical configuration relative to at least a portion of the resonant antenna and the second electrically-conductive loop and the second RFID IC have a second geometrical configuration relative to the at least portion of the resonant antenna, the first geometrical configuration and the second geometrical configuration exhibiting general symmetry with respect to each other; and,
   determining a location of the second object based upon a known location of the first electrically-conductive loop and the first RFID IC and the first object, and based upon an RF signal phase difference between the first electrically-conductive loop and the first RFID IC and the second electrically-conductive loop and the second RFID IC when subject to interrogation by an RFID reader, an RF signal strength difference between the first electrically-conductive loop and the first RFID IC and the second electrically-conductive loop and the second RFID IC when subject to interrogation by the RFID reader, or both the RF signal phase difference and RF signal strength difference between the first electrically-conductive loop and the first RFID IC and the second electrically-conductive loop and the second RFID IC when subject to interrogation by the RFID reader.

2. The radio-frequency identification (RFID)-based method as set forth in claim 1, further comprising ascertaining a connection state between the first object and the second object based upon the RF signal phase difference between the first electrically-conductive loop and the first RFID IC and the second electrically-conductive loop and the second RFID IC when subject to interrogation by an RFID reader, the RF signal strength difference between the first electrically-conductive loop and the first RFID IC and the second electrically-conductive loop and the second RFID IC when subject to interrogation by the RFID reader, or both the RF signal phase difference and the RF signal strength difference between the first electrically-conductive loop and the first RFID IC and the second electrically-conductive loop and the second RFID IC when subject to interrogation by the RFID reader.

3. The radio-frequency identification (RFID)-based method as set forth in claim 1, wherein at least one of the first object or the second object has a location that is known.

4. The radio-frequency identification (RFID)-based method as set forth in claim 1, wherein the general symmetry of the first geometrical configuration and the second geometrical configuration with respect to each other furnishes a generally corresponding RF signal phase of the first electrically-conductive loop and the first RFID IC and of the second electrically-conductive loop and the second RFID IC when subject to interrogation by an RFID reader.

5. The radio-frequency identification (RFID)-based method as set forth in claim 1, wherein the general symmetry of the first geometrical configuration and the second geometrical configuration with respect to each other furnishes a generally corresponding RF signal strength of the first electrically-conductive loop and the first RFID IC and of the second electrically-conductive loop and the second RFID IC when subject to interrogation by an RFID reader.

6. The radio-frequency identification (RFID)-based method as set forth in claim 1, wherein the first electrically-conductive loop and the first RFID IC and the second electrically-conductive loop and the second RFID IC exhibit a generally corresponding formation with respect to each other.

7. The radio-frequency identification (RFID)-based method as set forth in claim 1, further comprising moving the first object relative to the second object while the second object remains stationary when the first object, the second object, and the resonant antenna are brought within proximity of one another.

8. The radio-frequency identification (RFID)-based method as set forth in claim 1, further comprising placing a first holder within a first slot of the resonant antenna when the first object, the second object, and the resonant antenna are brought within proximity of one another, and placing a second holder within a second slot of the resonant antenna when the first object, the second object, and the resonant antenna are brought within proximity of one another, and wherein placement of the first holder within the first slot and placement of the second holder within the second slot establish the general symmetry of the first geometrical configuration and the second geometrical configuration with respect to each other.

9. The radio-frequency identification (RFID)-based method as set forth in claim 1, wherein the resonant antenna comprises a first segment part and a second segment part, the first segment part carried by the first object and the second segment part carried by the second object, and wherein bringing the first object, the second object, and the resonant antenna within proximity of one another involves bringing the first segment part and the second segment part together to construct the resonant antenna.

10. The radio-frequency identification (RFID)-based method as set forth in claim 9, wherein the first segment part is a stationary base segment part and the second segment part is a moveable segment part having an attachment to a cargo.

11. A radio-frequency identification (RFID)-based assembly, comprising:

a first electrically-conductive loop and RFID integrated circuit (IC) assembly;
a second electrically-conductive loop and RFID IC assembly;
a resonant antenna; and
at least one alignment formation that facilitates a generally symmetrical configuration between the first electrically-conductive loop and RFID IC assembly and the second electrically-conductive loop and RFID IC assembly with respect to the at least portion of the resonant antenna;
wherein at least one of the first electrically-conductive loop and RFID IC assembly, the second electrically-conductive loop and RFID IC assembly, or the resonant antenna has a known location;
wherein, when a connection is made among objects carrying at least one of the first electrically-conductive loop and RFID IC assembly, the second electrically-conductive loop and RFID IC assembly, and the resonant antenna, the generally symmetrical configuration is present between the first electrically-conductive loop and RFID IC assembly and the second electrically-conductive loop and RFID IC assembly with respect to at least a portion of the resonant antenna.

12. The radio-frequency identification (RFID)-based assembly as set forth in claim 11, wherein the generally symmetrical configuration between the first electrically-conductive loop and RFID IC assembly and the second electrically-conductive loop and RFID IC assembly with respect to the at least portion of the resonant antenna provides a generally corresponding RF signal phase of the first electrically-conductive loop and RFID IC assembly and of the second electrically-conductive loop and second RFID IC assembly when subject to interrogation, and provides a generally corresponding RF signal strength of the first electrically-conductive loop and RFID IC assembly and of the second electrically-conductive loop and second RFID IC assembly when subject to interrogation.

13. The radio-frequency identification (RFID)-based assembly as set forth in claim 11, wherein the generally symmetrical configuration between the first electrically-conductive loop and RFID IC assembly and the second electrically-conductive loop and RFID IC assembly with respect to the at least portion of the resonant antenna comprises a generally corresponding distance and orientation of the first electrically-conductive loop and RFID IC assembly with respect to the resonant antenna and of the second electrically-conductive loop and RFID IC assembly with respect to the resonant antenna.

14. The radio-frequency identification (RFID)-based assembly as set forth in claim 11, wherein the objects carrying at least one of the first electrically-conductive loop and RFID IC assembly, the second electrically-conductive loop and RFID IC assembly, and the resonant antenna include a first object coupled to both the first electrically-conductive loop and RFID IC assembly and the resonant antenna, and include a second object carrying the second electrically-conductive loop and RFID IC assembly, wherein the first object is a stationary object and the second object is a moveable object with respect to the first object.

15. The radio-frequency identification (RFID)-based assembly as set forth in claim 11, wherein the at least one alignment formation is at least one slot residing in the resonant antenna for reception of at least one holder carrying at least one of the first electrically-conductive loop and RFID IC assembly and the second electrically-conductive loop and RFID IC assembly.

16. The radio-frequency identification (RFID)-based assembly as set forth in claim 11, wherein the resonant antenna comprises a first segment part and a second segment part, and wherein, when a connection is absent among the objects carrying at least one of the first electrically-conductive loop and RFID IC assembly, the second electrically-conductive loop and RFID IC assembly, and the resonant antenna, the first segment part and the second segment part remain apart from each other, and wherein, when a connection is made among the objects carrying at least one of the first electrically-conductive loop and RFID IC assembly, the second electrically-conductive loop and RFID IC assembly, and the resonant antenna, the first segment part and the second segment part are brought together to construct the resonant antenna.

17. A radio-frequency identification (RFID)-based method, the RFID-based method comprising:

providing a first electrically-conductive loop and RFID integrated circuit (IC) assembly attached to a stationary object, and a second electrically-conductive loop and RFID IC assembly carried by a moveable object, wherein the stationary object has a location that is known;

providing a resonant antenna, the resonant antenna attached to the stationary object, carried by the moveable object, or carried by both the stationary object and the moveable object;

connecting the stationary object and the moveable object together, wherein, once connected, the first electrically-conductive loop and RFID IC assembly has a first geometrical configuration relative to at least a portion of the resonant antenna and the second electrically-conductive loop and RFID IC assembly has a second geometrical configuration relative to the at least portion of the resonant antenna, the first geometrical configuration and the second geometrical configuration exhibiting general symmetry with respect to each other; and ascertaining the connection between the stationary object and the moveable object based at least in part upon the known location of the stationary object and based at least in part upon an RF signal phase difference between the first electrically-conductive loop and RFID IC assembly and the second electrically-conductive loop and RFID IC assembly when subject to interrogation at one or more operational frequencies within an RFID operational band of a RFID reader, an RF signal strength difference between the first electrically-conductive loop and RFID IC assembly and the second electrically-conductive loop and RFID IC assembly when subject to the same interrogation at the one or more operational frequencies, or both the RF signal phase difference and the RF signal strength difference between the first electrically-conductive loop and RFID IC assembly and the second electrically-conductive loop and RFID IC assembly when subject to the same interrogation at the one or more operational frequencies.

* * * * *